Nov. 20, 1956  O. H. GRISWOLD  2,771,210
SAFETY CAPS FOR AIRCRAFT FUEL TANKS
Filed May 5, 1953  4 Sheets-Sheet 1

INVENTOR.
OWEN H. GRISWOLD
BY
ATTORNEYS

Nov. 20, 1956  O. H. GRISWOLD  2,771,210
SAFETY CAPS FOR AIRCRAFT FUEL TANKS
Filed May 5, 1953  4 Sheets-Sheet 2

INVENTOR.
OWEN H. GRISWOLD
BY
ATTORNEYS

Nov. 20, 1956 O. H. GRISWOLD 2,771,210
SAFETY CAPS FOR AIRCRAFT FUEL TANKS
Filed May 5, 1953. 4 Sheets-Sheet 3
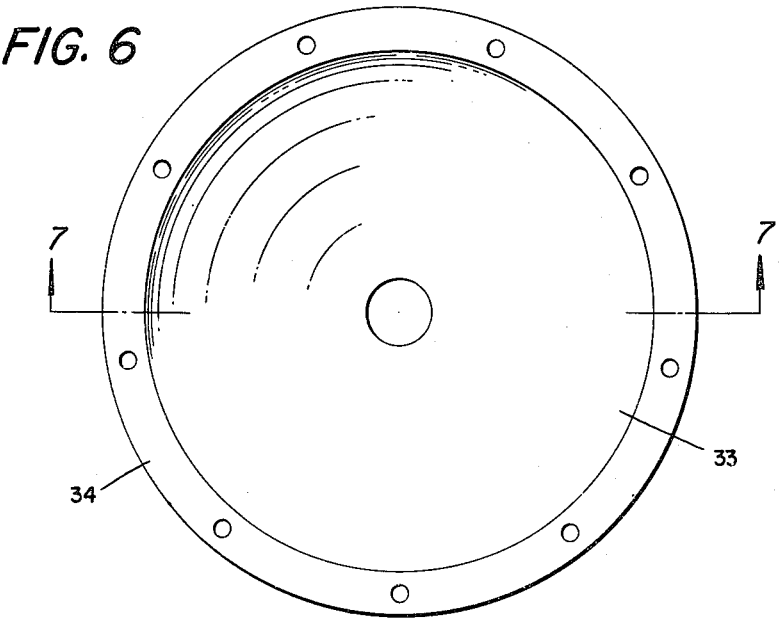
FIG. 6
FIG. 7
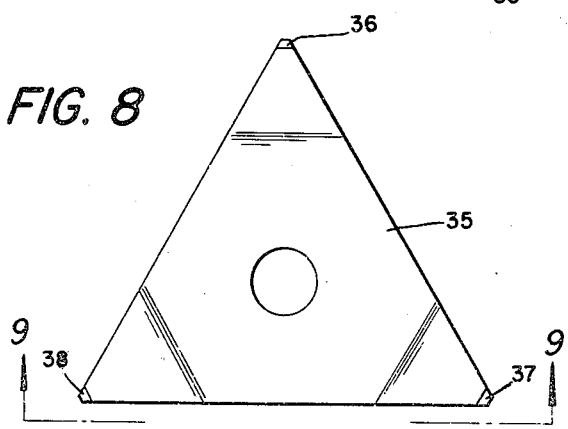
FIG. 8
FIG. 9
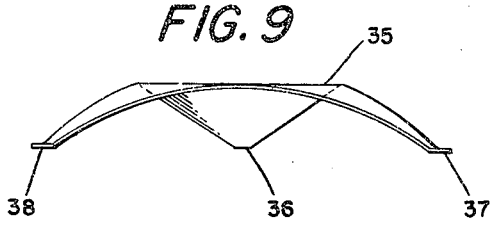
INVENTOR.
OWEN H. GRISWOLD
BY
ATTORNEYS

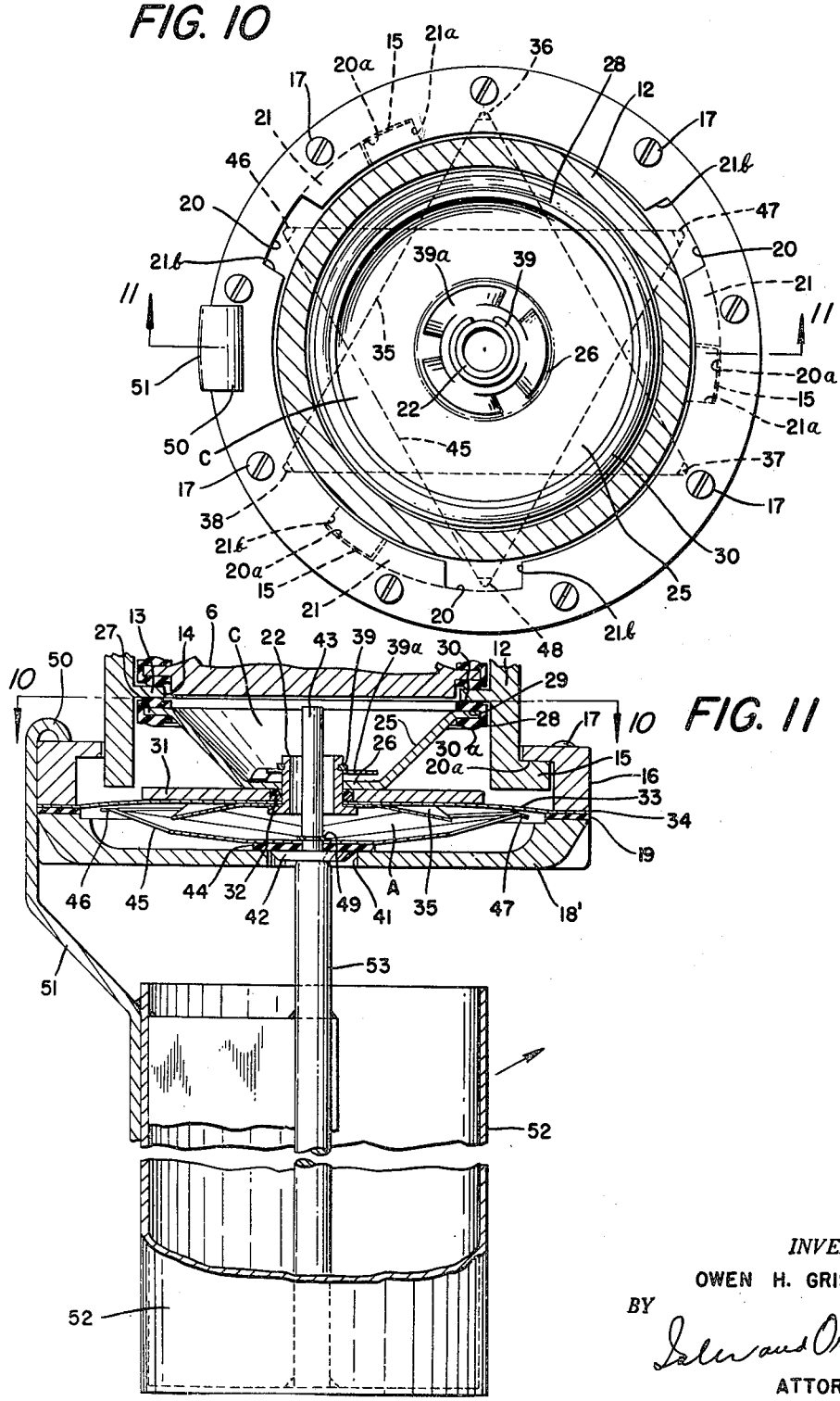

United States Patent Office 2,771,210
Patented Nov. 20, 1956

2,771,210

SAFETY CAPS FOR AIRCRAFT FUEL TANKS

Owen H. Griswold, Paramus, N. J.

Application May 5, 1953, Serial No. 353,215

10 Claims. (Cl. 220—40)

This invention relates, as indicated, to safety caps for aircraft fuel tanks.

A primary object of the invention is to provide a safety cap of the character described, which maintains a fluid tight seal under all conditions of operation of pressurized aircraft fuel tanks, including positive, zero and negative pressures.

Another object of the invention is to provide a safety cap of the character described having means incorporated therein for permitting drainage therethrough of water which collects in the fuel tanks.

A further object of the invention is to provide a safety cap of the character described which consists of a minimum number of easily manufactured parts which can be quickly and inexpensively assembled or disassembled.

Other objects and advantages of my invention will be apparent during the course of the following description.

In the accompanying drawings forming a part of this specification, and in which like numerals are employed to designate like parts throughout the same, Fig. 1 is a fragmentary view of the filler opening portion of an aircraft fuel tank, with portions broken away to better illustrate certain features of the invention;

Fig. 6 is a top plan view of the diaphragm;

Fig. 7 is a cross-sectional view of the diaphragm, taken on the line 7—7 of Fig. 6;

Fig. 8 is a top plan view of the spring;

Fig. 9 is an elevational view of the spring, as viewed in the direction indicated by the line 9—9 of Fig. 8;

Fig. 10 is a cross-sectional view, similar to Fig. 3, taken on the line 10—10 of Fig. 11, but of a modification of the invention, and Fig. 11 is a cross-sectional view, taken on the line 11—11 of Fig. 10.

Figure 1:
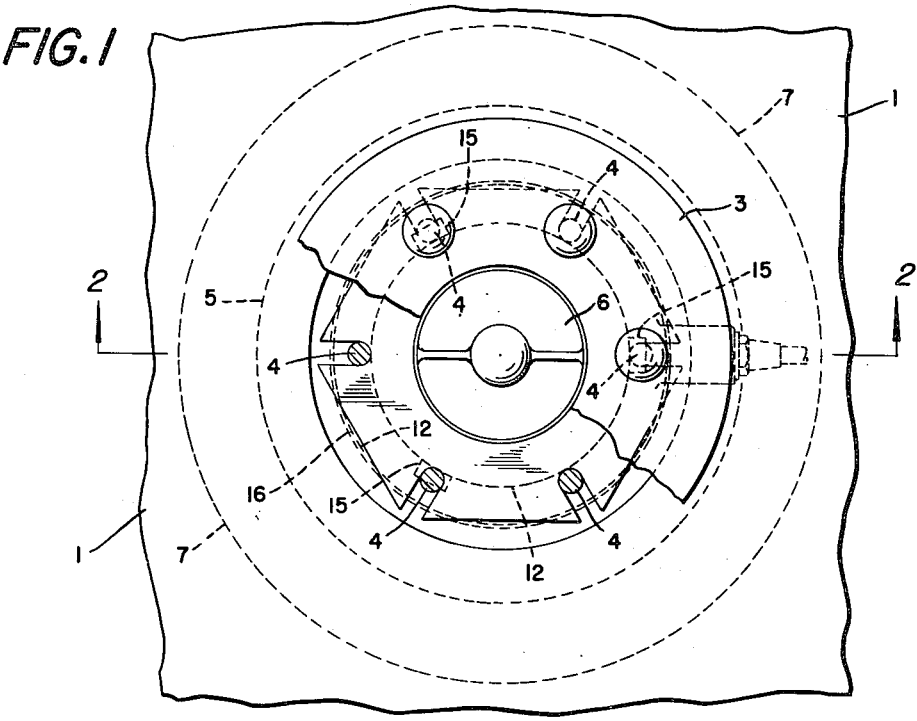

Referring more particularly to Figs. 1 to 9 inclusive of the drawings, reference numeral 1 designates the bottom of an aircraft pressurized fuel tank, and 2 the skin of the aircraft.

Figure 2:
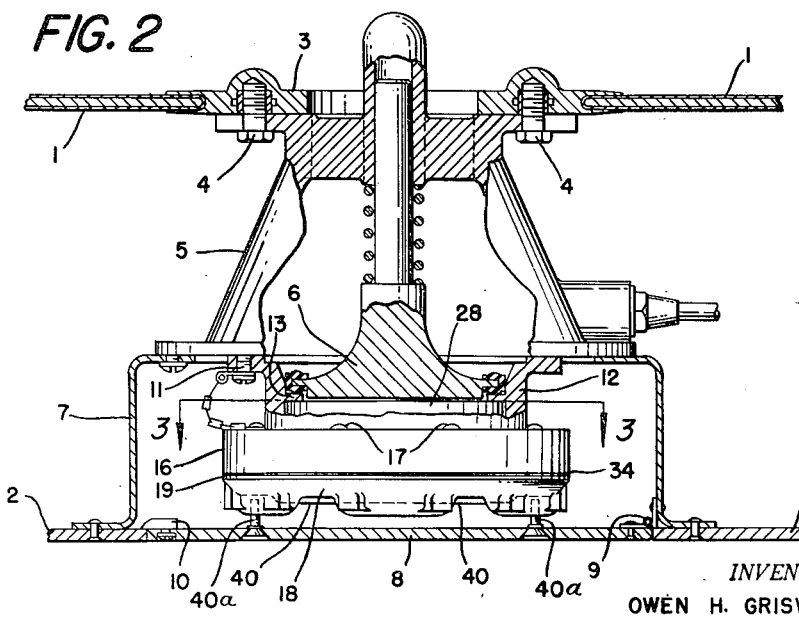
Fig. 2 is a fragmentary cross-sectional view, taken on the line 2—2 of Fig. 1.
Figure 3:
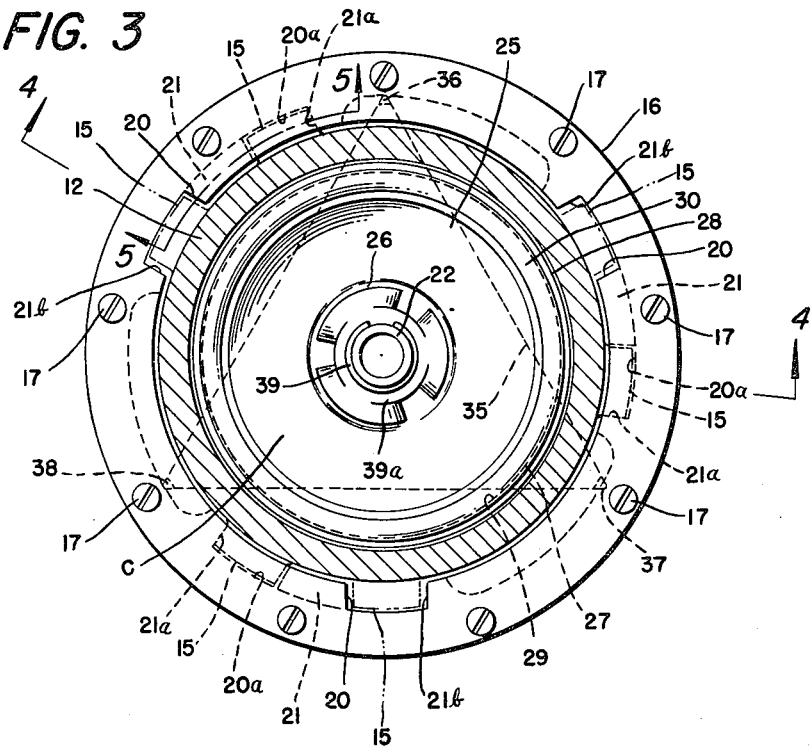
Fig. 3 is a cross-sectional view, taken on the line 3—3 of Figs. 2 and 4.
Figure 4:
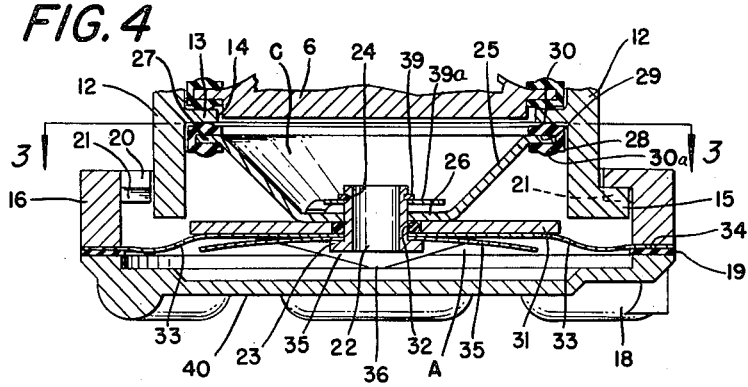
Fig. 4 is a fragmentary cross-sectional view, taken on the line 4—4 of Fig. 3.
Figure 5:
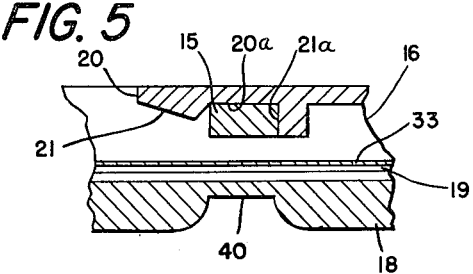
Fig. 5 is a fragmentary cross-sectional view, taken on the line 5—5 of Fig. 3.

The bottom 1 of the tank has a filler opening defined by an annular fitting 3, which is secured to the tank in the manner shown in Figs. 1 and 2, this fitting, which is part of the tank, being one of the type known as AN 4130–7 (Air Force-Navy Aeronautical Standards), or a similar fitting. Secured to the lower surface of the fitting 3, as by screws or bolts 4, is an adapter valve body or housing 5, which may be of the type shown in MS 29518, Military Standard, and houses a spring-loaded poppet check valve 6, the function of which will be described hereinafter. The adapter valve body 5 is supported in spaced relationship to the skin 2 by means of a spacer element 7 which is part of the aircraft.

Immediately below the adapter valve, a door 8 is provided which is hinged, as at 9, to the skin of the aircraft, this door being flush with the skin, and being provided with a latch 10 which holds the door in closed position, except when the tank 1 is to be fueled or defueled.

Secured to the adapter valve 5, as by screws 11, is a bayonet type of adapter or filler neck 12, of annular form, having a radially-inwardly extending flange 13, the upper surface of which provides a seat for the poppet check valve 6, the flange defining a filler opening 14. The adapter 12 is provided at its lower edge with three radially-outwardly extending, circumferentially-spaced lugs 15. The adapter may be of the type shown in MS 29514 and 29518, Military Standard.

The parts which have been thus briefly described are standard or conventional, and form no part of the present invention, other than to aid in an understanding of the function or use of the safety cap which is now to be described, and which forms the subject of this invention.

The cap comprises an annular cam or cam ring 16, to which is secured, as by bolts 17, a cover 18, a gasket 19, preferably of fuel resistant synthetic rubber, being interposed between the ring and cover. The ring is molded to provide radial recesses 20 which are spaced circumferentially to correspond with the spacing of the lugs 15 of the adapter 12, and are also provided adjacent each of the recesses 20 with inclines 21, recesses 20a, and circumferentially-spaced stops 21a and 21b. The inclines 21 are adapted to coact with the lugs 15 to lock the cap to the adapter. This bayonet locking is effected by moving the cap towards the adapter in such a manner as to cause the lugs 15 to enter the recesses 20 and pass below these recesses, after which the cap is rotated approximately 35°, in a counter-clockwise direction, as viewed in Fig. 3. This interlocking is facilitated by reason of the provision of the inclined surfaces of the inclines 21, which produce a cam-like action. After the inclines 21 have passed the lugs 15, the lugs enter the recesses 20a, due to the spring action of the cap, and thus, the cap is securely locked against rotation in either direction. Rotation of the cap beyond this point is prevented by the engagement of the stops 21a with the lugs 15. Clockwise movement of the cap, when it is to be locked to the adapter, would be prevented by the engagement of the stops 21b with the lugs 15. Removal of the cap from the adapter is effected by pushing the cap upwardly, against the aforesaid spring action, then rotating it in a clockwise direction approximately 35°, and withdrawing the cap from the adapter.

Disposed within the central portion of the cap is a hollow pin 22 provided with an outwardly extending flange 23 at its lower edge, and an annular groove 24 adjacent its upper end.

Mounted on the pin 22 so as to be rotatable thereabout is a conical member 25 having an inwardly extending flange 26 at its lower edge, which encircles the pin, and an outwardly extending flange 27 at its upper edge, to which a fuel resistant synthetic rubber sealing ring or seal 28 is secured, the ring having an annular groove 29 into which the peripheral portion of the flange 27 extends. This ring or seal 28, being made of a synthetic rubber or like material, is stretchable, so as to facilitate removal and replacement thereof. The ring or seal 28 is of the cross-section shown in Fig. 4, and is symmetrical in form, so that it may be removed and reversed if the upper or lower sealing face 30 or 30a is damaged. This form of cross-section, which includes protuberances 30b and 30c extending from the faces 30 and 30a respectively, has been found to effectively resist blowing of the ring from its seat under tank pressures of 70 p. s. i. or more.

The flange 26 of the conical member 25 rests on a washer 31, the wall of the opening in which is spaced from the outer wall of the pin 22 to provide a space in which an O ring 32 is disposed. The washer 31 provides stability for a flexible diaphragm 33, preferably made of stainless steel having a spring temper, which is disposed below the washer and encircles the pin 22. The diaphragm 33 has a peripheral flange 34 which is interposed between the gasket 19 and ring 16 and is thus clamped between the ring and cover 18. The diaphragm 33 is in the form of a spherical segment of one base when formed, but relaxes into the form shown in Figs. 6 and 7, having a flattened central portion. It is installed in the cap, with its outer surface facing the cover 18. However, the center of the diaphragm is pushed upwardly by a triangular-shaped spring 35, the central portion of which is clamped between the flange 23 of the pin 22 and the diaphragm, and the apices of which form legs 36, 37 and 38 which bear against the cover 18. This upward pressure of the spring 35 distorts the diaphragm in such a manner as to produce the cross-section shown in Fig. 4. The distorted form of the installed diaphragm results in a minimum of force being exerted by the diaphragm, which is a desirable condition.

The O ring 32 forms a fluid-tight seal between the conical member 25 and the diaphragm 33. The conical member 25 is clamped in position by a snap ring 39 which is disposed in the groove 24 of the pin 22, a spring washer 39a being interposed between the ring 39 and the flange 26 of the conical member. The purpose of the spring 39a is to maintain the parts in contact when the cap is in the off position, whereby preventing dirt from entering between the parts, and also to prevent rattling. It improves the feel of the unit while permitting swelling of the rubber O ring which occurs in aromatic fuels to which the cap is subjected. The spring loading by means of the spring 35 permits swelling of both the main seal and the O ring without materially altering the loads required to install or remove the cap.

The use and operation of the cap will now be briefly described.

The spring 35, bearing on the cover 18, applies an initial sealing pressure to the seal 28 through the conical member 25, so that the face 30 of the seal is in fluid-sealing relationship with the lower surface of the flange 13 of the adapter 12. The surfaces 20a of the cap transfer the fuel tank pressure load to the upper surfaces of the lugs 15 through the bolts 17.

When the fuel tank is pressurized, the pressure within the chamber C formed by the conical member is transferred through the hollow pin 22 and to the chamber A to the lower surface of the diaphragm 33. The diaphragm is so formed that this pressure exerts the major portion of the resultant force on the center of the diaphragm, rather than on its peripheral portion. The force resulting from the pressure in chamber A, acting on its effective area, is greater than the force of the same pressure in the chamber C acting over its effective area, and therefore, there is always a resultant force tending to seal the cap (through seal 28) under any positive pressure.

When the pressure is zero or negative, pressure is maintained on the seal 28 by the spring 35.

The diameter of the washer 31 is such as to not only provide ample support for the diaphragm 33 which is extremely flexible, but to also transfer a large proportion of the air pressure load to the seal 28, the balance of the load being taken at the periphery by the cover 18. This also prevents deformation of the diaphragm 33 in the area thereof adjacent the O ring 32, and thus prevents leakage at this point.

The sealing pressure, as already stated, is due to the air pressure acting over the larger area between the diaphragm and the cover, the spring 35 acting with the air pressure on positive pressures and opposed negative pressures (fuel or air). Its forces are not important under high pressures and its value lies at zero or negative pressures.

For the purpose of facilitating placement and removal of the cap, the cover 18 is molded to provide circumferentially-spaced lands 40, constituting finger grips. These lands also serve another purpose, which is as follows. The door 8 is provided with a series of circumferentially-spaced upstanding pins 40a. If the cap is improperly closed, these pins strike the lands 40 and thus prevent closure of the door 8. If the cap is properly closed, the pins 40a enter the spaces between the lands 40 and permit closure of the door 8.

The cap which has been described is located in the bottom of the fuel tank, because it is used for fueling as well as defueling. The poppet type check valve, the which reference has been made, prevents the fuel from draining out of the tank when the cap is removed, and for this reason, the present cap is referred to as a "safety" cap, its function being to prevent loss of fuel in the event the check valve leaks. It is to be understood, however, that the cap may be used in other locations or other purposes.

It may also be noted that the type of installation which has been described is merely a typical one, there being several other types of adapters and numerous other ways in which the fuel tanks and adapters may be installed. One such adapter is made with holes in the sides thereof, and the skin 2 of the plane forms the bottom of the integral tank.

Another important variation involves omission of the door 8 and a variation of the cap which has a wide bottom whose surface 18 is flush with the skin 2. This is termed a "flush" installation, since the cap fills the opening in the skin and is a continuation of the outer skin. Such a cap will have a submerged or flush handle.

In Figs. 10 and 11, a modification of the cap is shown, in which a sump drain is incorporated, for purposes to be presently described.

This modified form of cap is essentially of the same construction as the previously described cap. In the modified cap, the cover 18' is provided with a central opening 41, in which the head 42 of the pin 43 is disposed. The pin 43 extends through a rubber sealing washer 44, which rests on the cover 18' and thus seals the opening 41 against passage of fluid therethrough. A spring 45, similar in form to the spring 35, but in inverted position, and with its apices 46, 47 and 48 displaced circumferentially relatively to the apices 36, 37 and 38 of the spring 35, is clamped to the washer 44 by a snap ring 49, which is snapped to the pin 43 just above the head 42.

The apices or legs 46, 47 and 48 of the spring 45 bear against the lower surface of the diaphragm 33, and thus the spring normally maintains the washer 44 in sealing position, as shown.

Supported on the cap, as by means of the hook 50 of a bracket 51, is a drain bottle 52, to the center of the bottom of which a rod 53 is welded, the rod extending upwardly to a point closely adjacent the head 42 of the pin 43.

In order to operate the drain valve, the drain bottle is tilted by moving it in the direction indicated by the arrow in Fig. 11, thereby causing the rod 53 to push the head 42 of the pin 43 upwardly sufficiently to lift the sealing washer 44 off its seat. This lifting is accomplished against the pressure of the spring 45. Continued upward movement of the pin 43 brings the pin into contact with the poppet check valve 6, opening this valve sufficiently to permit water which has collected above the valve to flow out and run into the conical member 25, through the hollow pin 22 and out through the opening 41 and into the drain bottle. The length of the pin 43 is such that when the bottle is withdrawn the adapter valve 6 closes first, and the washer 44 seals thereafter, due to the pressure of the spring 45. Since the spring 45 has a relatively light pressure, in contrast to the heavy closing pressure of the valve 6, it is a relatively simple matter to hold the pin 43 up until the cap has drained. This permits draining of the cap after the adapter valve is closed.

This draining feature is applicable to all aircraft, because condensation causes water to collect in the lowest point of the fuel tank system. It is especially important, however, for naval planes operating from carriers, because the ship's (carrier) fuel storage tanks are ballasted with salt water when empty, creating the possibility that some of this water finds its way into the plane fuel tanks, necessitating draining of the sumps of the plane fuel tanks before each flight.

Although the use of a drain bottle has been described in connection with the cap having a sump drain, the use of such a bottle is merely a convenience and not a necessity, since the pin 43 can be pushed upwardly by means of a screw driver or similar tool to effect draining.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a safety cap of the character described, a housing, a hollow pin disposed centrally of said housing, a member encircling said pin and having sealing means secured to the periphery thereof, means supporting said member, a flexible diaphragm supporting said last named means, and means resiliently supporting said pin, member, supporting means and diaphragm to cause said sealing means to seat against a seating surface, said hollow pin having a passageway therethrough communicating the space above said member with the space below said diaphragm, whereby pressure from said first-named space may be transferred through said pin to the lower surface of said diaphragm, said housing and diaphragm being rotatable relatively to said member and without rotating said member.

2. A safety cap, as defined in claim 1, in which said member has a portion of conical form providing a chamber between it and said pin from which said pressure is transferred.

3. A safety cap, as defined in claim 2, in which spring means are provided for urging said member into engagement with said first-named supporting means.

4. A safety cap, as defined in claim 3, in which said first-named supporting means overlies a major portion of the area of said diaphragm.

5. A safety cap, as defined in claim 4, in which said first-named supporting means has a central opening providing an annular space between the wall of said opening and said pin, and a sealing ring is disposed in said opening, which provides a seal between said member and said diaphragm.

6. A safety cap, as defined in claim 5, in which the outer peripheral portion of said diaphragm is secured to said housing.

7. A safety cap, as defined in claim 6, in which said member is rotatable relatively to said pin.

8. A safety cap, as defined in claim 7, in which said hollow pin is provided at its lower end with an outwardly extending flange which supports said diaphragm in spaced relation to the floor of said housing.

9. In combination with an adapter or filler neck having a radially-inwardly extending flange defining a filler opening of substantial diameter, the lower edge of said flange providing a seat, a safety cap comprising a housing removably secured to said adapter, a hollow pin disposed centrally of said housing, a member encircling said pin and having sealing means secured to the periphery thereof, means supporting said member, a flexible diaphragm supporting said last-named means, and means resiliently supporting said pin, member, supporting means and diaphragm to cause said sealing means to engage said seat, said hollow pin having a passageway therethrough communicating the space above said member with the space below said diaphragm, whereby pressure from said first-named space may be transferred through said pin to the lower surface of said diaphragm, said housing being rotatable relatively to said member, whereby to permit rotation of the housing without rotating said member or sealing means.

10. The combination, as defined in claim 9, in which said means supporting said member comprises a washer which engages the central portion of said diaphragm over a relatively large area so that the major portion of the pressure below the diaphragm is transmitted to the sealing means through member and washer, and only a minor portion of said pressure is transmitted to the peripheral portion of the diaphragm.

References Cited in the file of this patent

UNITED STATES PATENTS

| | | |
|---|---|---|
| 171,514 | Hyde | Dec. 28, 1875 |
| 1,741,250 | Protzer | Dec. 31, 1929 |
| 2,050,562 | De Lawter | Aug. 11, 1936 |
| 2,203,801 | Swank | June 11, 1940 |
| 2,262,823 | Stearns | Nov. 18, 1941 |
| 2,629,514 | Savolinen | Feb. 24, 1953 |
| 2,641,986 | Arthur | June 16, 1953 |